United States Patent [19]

Hegler et al.

[11] 3,976,414

[45] Aug. 24, 1976

[54] APPARATUS FOR THE PRODUCTION OF DOUBLE-WALLED SYNTHETIC PLASTIC TUBES HAVING A TRANSVERSELY CORRUGATED OUTER WALL AND A SMOOTH INNER WALL

[76] Inventors: Wilhelm Hegler; Ralph-Peter Hegler, both of Goethestr. 2, 873 Bad Kissingen, Germany

[22] Filed: Mar. 18, 1975

[21] Appl. No.: 559,455

[30] Foreign Application Priority Data

Mar. 22, 1974 Germany............................ 2413879

[52] U.S. Cl. .............................. 425/131.1; 425/381; 425/395
[51] Int. Cl.² .......................................... B29D 23/04
[58] Field of Search .......... 425/112, 113, 380, 381, 425/403, 392–397, 131.1

[56] References Cited
UNITED STATES PATENTS

| 3,188,690 | 6/1965 | Zieg .................................... 425/396 |
| 3,201,827 | 8/1965 | Reynolds et al. .................... 425/403 |
| 3,349,156 | 10/1967 | Zieg .................................... 425/380 |
| 3,677,676 | 7/1972 | Hegler ................................. 425/112 |
| 3,743,456 | 7/1973 | Cini ..................................... 425/112 |
| 3,743,457 | 7/1973 | Cini ..................................... 425/113 |

FOREIGN PATENTS OR APPLICATIONS

| 338,412 | 5/1969 | U.S.S.R. |
| 1,253,393 | 10/1968 | United Kingdom................ 425/380 |
| 1,132,711 | 7/1962 | Germany........................ 425/381 |

Primary Examiner—Francis S. Husar
Assistant Examiner—Carl Rowold
Attorney, Agent, or Firm—Burgess, Dinklage & Sprung

[57] ABSTRACT

An improvement in an apparatus for forming an outer corrugated tube wherein the corrugations of said tube abut an inner tube within said corrugated tube, said apparatus comprising means for forming an outer corrugated tube about a dye, means for forming said inner tube about a central mandrel within said corrugated tube, the improvement comprising means for urging an inner tube against the corrugations of said outer corrugated tube, said means comprising a presser floating mounted within said inner tube in facing relationship to said inner tube and bearing outward towards said inner tube.

16 Claims, 5 Drawing Figures

APPARATUS FOR THE PRODUCTION OF DOUBLE-WALLED SYNTHETIC PLASTIC TUBES HAVING A TRANSVERSELY CORRUGATED OUTER WALL AND A SMOOTH INNER WALL

BACKGROUND OF THE INVENTION

1. Field of the Invention

This invention relates to an apparatus for the production of a double-walled synthetic plastic tube characterized by a smooth inner tube which abuts the nadir of the corrugations of the outer tube within the outer tube. This invention is particularly concerned with an improvement which insures that the inner tube is smooth and has a constant thickness about its circumference. This invention is particularly directed to an apparatus which insures that at any point of the tube the thickness of the tube is not greater on one side of the inner tube than it is on the opposite side thereof or at another point along its circumference. This invention is especially concerned with the production of a double-walled corrugated plastic tube having an inner tube which abuts the corrugations of the outer corrugated tube on the inside thereof which inner tube is of an especially small thickness.

2. Discussion of the Prior Art

It has already been proposed to produce double-walled synthetic plastic tubes having an annularly or helically corrugated outer wall and a longitudinally smooth inner wall by extruding two concentric tubes in one operation, the other tube being extruded from a first annular extrusion die into a mold cavity formed by divided molds having transverse internal grooves and forming two cooperating endless recirculating trains of mold halves which close to complete the mold cavity, said tube being made to conform with the shape of the transverse grooves, whereas the inner tube is extruded from a second die extending into the interior of the mold, and is pushed into contact with the fully formed outer tube.

It is also known in apparatus for the production of such double-walled tubes to attach to the mandrel of the die for extruding the inner tube a mandrel extension having a diameter at least approximately corresponding to the internal diameter of the outer corrugated tube so that this extension will operate to press the inner tube against the outer tube so that the two tubes are satisfactorily bonded together by fusion (German Patent Specification No. 1,704,718 published prior to acceptance).

In these known arrangements difficulties arise in connection with a sufficiently accurate central location of the mandrel extension inside the mold to ensure that the wall thickness of the resultant double-walled tube is uniform around its entire circumference. Moreover, irregularities in the extrusion of the plastics stream may cause the mandrel extension to be forced aside and to remain in this position with the resultant production of a tube in which the wall thickness is not uniform all around.

SUMMARY OF THE INVENTION

The problems encountered by prior art apparatuses are solved by an improvement in accordance with this invention. The improvement is provided in an apparatus for forming an outer corrugated tube wherein the corrugations of said tube abut an inner tube within said corrugated tube, said apparatus comprising means for forming an outer corrugated tube about a die, means for forming an inner tube about a central mandrel and within said corrugated tube. The improvement resides in that means for urging said inner tube against the corrugations of said outer corrugated tube on the interior thereof, are provided, said means comprising a presser floating mounted in said inner tube in facing relationship to said inner tube and bearing outward toward said inner tube.

In accordance with this invention there is provided a fully floating press-on device suitably mounted on a mandrel extrusion of a known type of apparatus. This press-on device can, within limits, yield to the pressure of the hot plastically formable synthetic material in every direction so as to maintain a concentric alignment. This insures that the walls of the inner tube are not thicker on one side of the tube than on the opposed side. The device is provided with a resilient means which resiliently urges the presser toward the interior walls of the inner tube to prevent the weight of the press-on device from causing the wall thickness at the bottom of the tube from becoming thicker than at the top. It is preferred that the float-on device comprises a resilient member which compensates the weight of the press-on device (presser) so that the latter can adjust itself to concentricity.

In a simple embodiment of this invention the floating presser can be constituted about an ordinary ring having a smooth surface. Unfortunately, smooth rings can be open to the objection that, when considerable pressure is exerted or when the inner tube is to be a very thin-walled tube, the inner wall may stick to the peripheral surface of the presser ring and break. If this happens the synthetic plastic may accumulate on the upstream side of the mandrel extension necessitating removal of this accumulation. The removal operation may require the stopping of the machine for a long period of time.

In order to avoid such occurrences, the pressure device, in accordance with the invention, can be a cylinder provided on its outer surface with grooves, particularly grooves forming a single or multiple helix. If at the same time supporting air is introduced in the zone within the inner tube so that a slight gauge pressure develops between the dies which extrude the inner and outer tubes, the air will flow through the helical grooves in the cylinder. This motion of the air through the helical grooves is turbulent creating an air cushion which builds up between the cylinder and the inside of the inner tube. This cushion prevents direct contact between the presser surface and the inner wall of the inner tube. When tubes are being produced in which the transverse corrugations in the outer tube are helical, it is preferred that the helical grooves in the rotatable cylinder have a pitch opposite to the pitch of the corrugations of the outer tube.

In some instances, particularly when tubes having a major internal diameter and a major wall thickness are to be produced, then the pressure which the rotatable cylinder can produce by means of creating an air cushion is insufficient to press the inner tube into firm contact within the inside of the outer tube. In such a case, the floating presser device can comprise barrel-shaped overlapping rollers freely rotatable about an axis extending cross-wise of the longitudinal axis of the mandrel. This specific configuration will be more readily appreciated from the below disclosure.

Referring to the use of barrel-shaped rollers, in order to insure that every part of the inner tube is pressed into contact with the interior walls of the outer tube satisfactorily, it is preferred to provide two or more sets of oppositely disposed barrel rollers. Generally speaking, these sets would be positioned sequentially along the path that the corrugated tube and inner tube would travel. Each set of opposed barrel-shaped rollers can comprise two rollers oppositely disposed although the sets of barrel rollers generally comprise four separate barrel rollers. By employing sets of barrel rollers containing four barrel-shaped rollers is only required to have two of such sets angularly off-set from one another. By positioning the rollers of the second sequential step of the barrel rollers at an off-setting angle from the rollers of the first step it is insured that the plastically formable material of the inner tube will be urged toward the interior walls of the corrugated outer tube and will in many instances partially fill the openings of the corrugations. Such an assembly is particularly useful in the manufacture of corrugated tubes having inner tubes which do not add appreciably, by their thickness, to the thickness of the corrugated tubes themselves.

Many synthetic plastic materials employed for making corrugated plastic tubes, particularly polyvinyl chloride, have surfaces which are sticky when they are in a plastically formable state. The surface of the mandrel extension on which the floating presser is resiliently mounted must therefore, be of a kind to which the synthetic plastics will not stick. In many cases, highly polished surfaces will not be sufficient to prevent the plastic in its plastically formable state from sticking. However, a considerable improvement can be obtained if all of the surfaces of the pressure device which become in contact with the inside of the inner tube are provided with a coating of polytetrafluoroethylene.

BRIEF DESCRIPTION OF DRAWINGS

In order to more fully illustrate the nature of the invention, reference is made to the accompanying drawings in which.

DESCRIPTION OF SPECIFIC EMBODIMENTS

Figure 1:
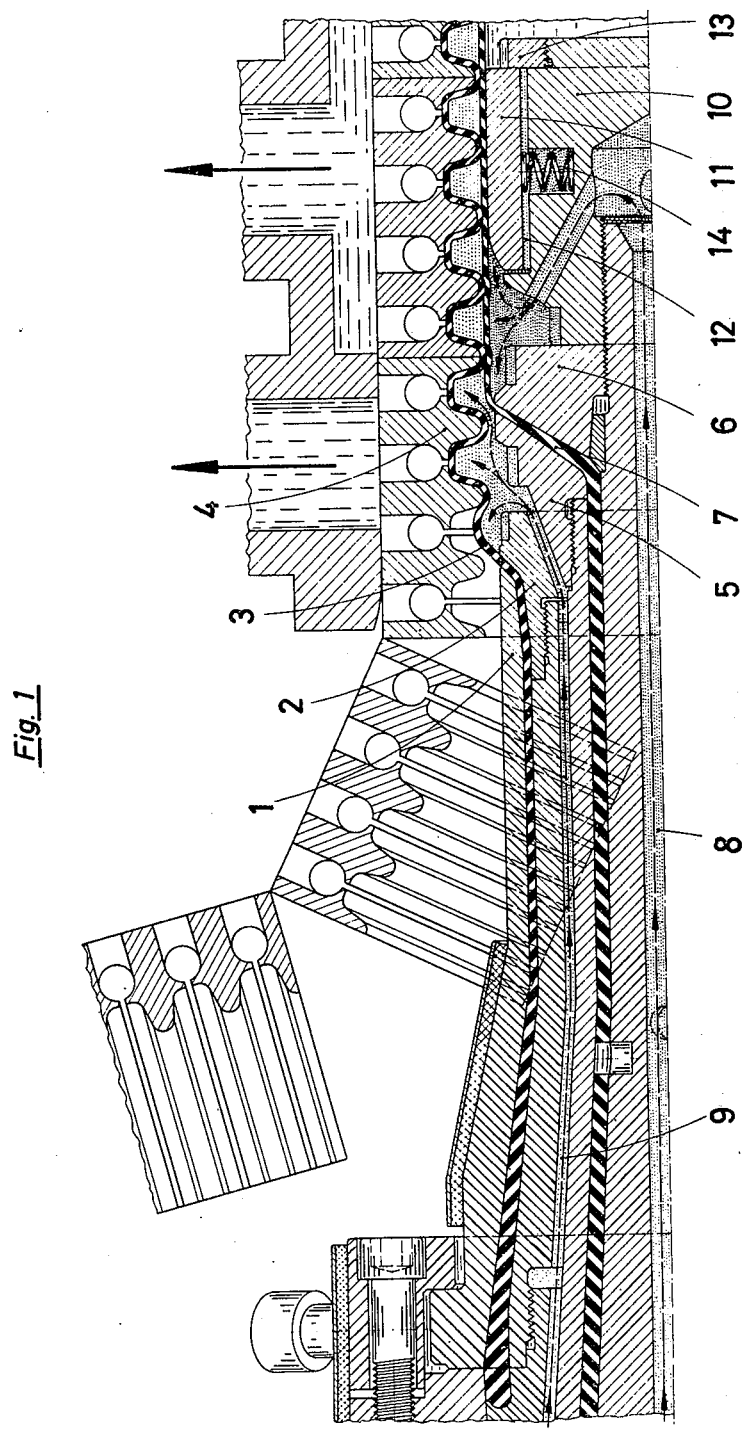
FIG. 1 is an embodiment of a floating presser device in the form of a smoothing ring.

Referring to the drawings herein and particularly to FIG. 1, a string of synthetic plastic 3 is extruded from a die 1 over a mandrel 2. This extrusion is formed into a transversely corrugated tube inside a train of molds 4 containing internal grooves from which the air is evacuated. A second stream of synthetic plastic 7 is extruded from a die 5 over a mandrel 6 to form an inner tube. Supporting air is introduced through channels 8 and 9, the pressure of this air being slightly above atmospheric, that in channel 8 preferably slightly exceeding that in channel 9. A press-on device 11 is provided on an extension 10 of the mandrel 6 with clearance 12 between the press-on device in the form of a ring 11 and the mandrel extension 10 to permit the ring 11 to move freely in any direction in a plane normal to the axis of the extruding die. A threaded ring 13 prevents the ring 11 from axially shifting and at the same time forms a seal which stops the compressed air from escaping through the clearance 12. In order to provide an even all-round floating location of the ring, irrespectively of its weight, a spring 14 is interposed between the extension 10 and the ring 11. The biasing thrust of this spring is just sufficient to compensate the weight of the ring 11 when the clearance gap 12 is the same at the top and the bottom. When the mandrel is fitted into the apparatus, care must naturally be taken to ensure that this spring 14 is located above the mandrel in the vertical plane containing the mandrel axis.

Figure 2:
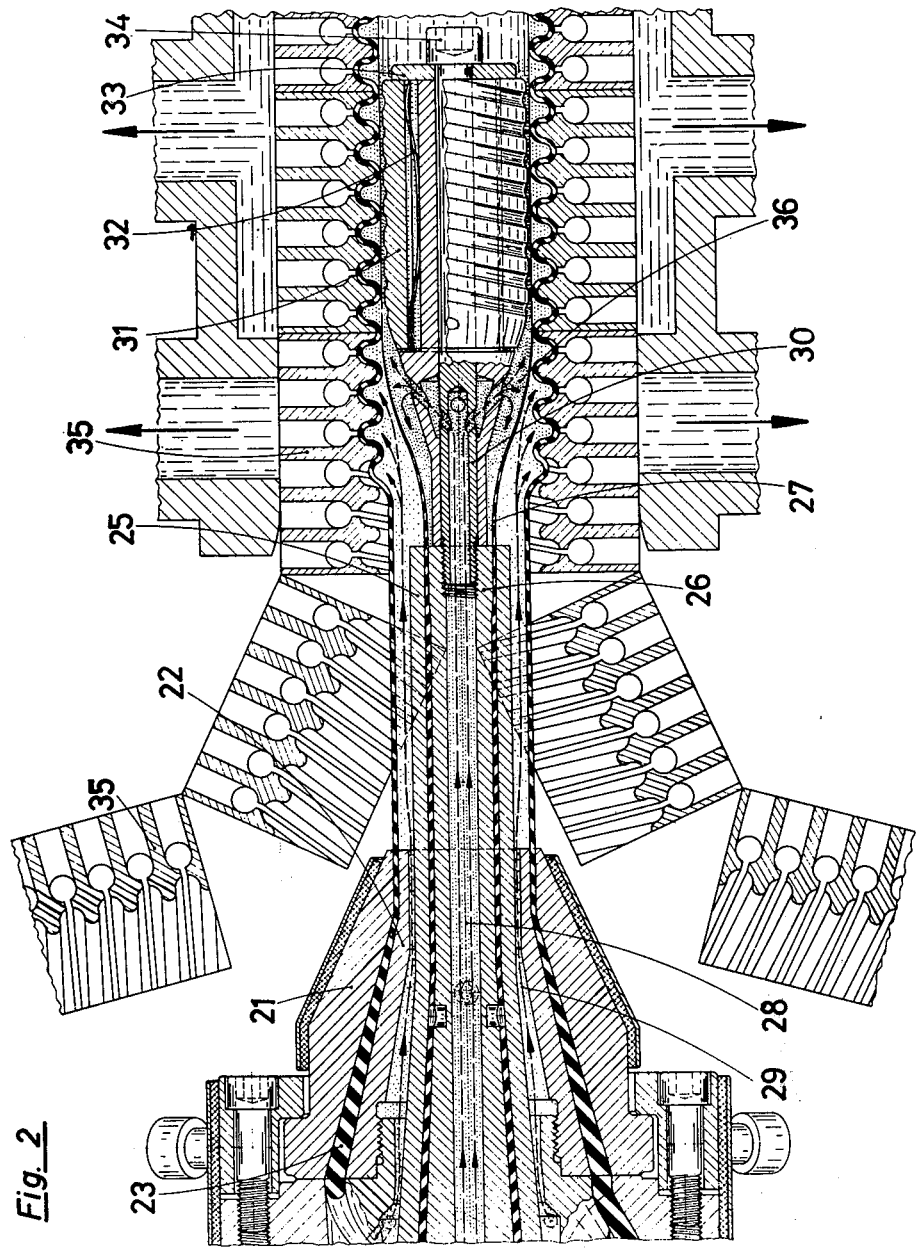
FIG. 2 is an embodiment comprising a floating cylinder provided with helical grooves.

In the embodiment according to FIG. 2 which illustrates a slightly different extruder, a first stream of synthetic plastic 23 is again extruded from a die 21 over a mandrel 22 for the production of a transversely corrugated outer tube, and a second stream of synthetic plastic 27 from a second die 25 over a second mandrel 26. Channels 28 and 29 are again provided for the admission of supporting air, the pressure of the air introduced at least through channel 28 exceeding atmospheric pressure by not less than 10 to 30%.

An extension 30 is attached to the mandrel 26 and this carries a fully floating cylinder 31. The weight of the cylinder 31 is compensated by the insertion in the air gap between the extension 30 and the cylinder 31 of a leaf spring 32 which is so biased that it is just able to carry the weight of the cylinder 31 when this is in a position concentrically surrounding the extension. A retaining disc 33 secured by a nut 34 prevents the cylinder 31 from being axially displaced and at the same time seals the clearance gap between the clyinder 31 and the mandrel extension 30. The cylinder 31 is externally provided with helical grooves, preferably forming a multiple helix pitched contrary to the helical grooves in the molds 35. The slight gauge pressure of the supporting air entering the space 36 through the channel 28 operates to push the air between the cooperating surfaces of the inner tube 27 and the cylinder 31. The presence of the helical grooves imparts imbalance to this air which results in the formation of an air cushion between the cylinder 31 and the inner tube 27. This air cushion permits the diameter of the cylinder 31 to be slightly reduced.

In other words, the diameter of the cylinder may be less than the internal diameter of the finished plastic tube. Since in such a case there will be no contact between the inner tube 27 and the cylinder 31 and the tube will therefore glide on the intervening air cushion, this device enables double-walled tubes to be extruded which have a very thin inner wall of which the thickness can be reduced to as little as 0.05 mm. Apart from the advantage of low weight, reduced consumption of raw material, high vertical crushing strength and a smooth inside surface, such double-walled tubes have the further advantage that the inner tube hardly affects the flexibility of the tube which flexibility is not significantly less than that of a corrugated tube lacking an internal wall.

Figure 3:
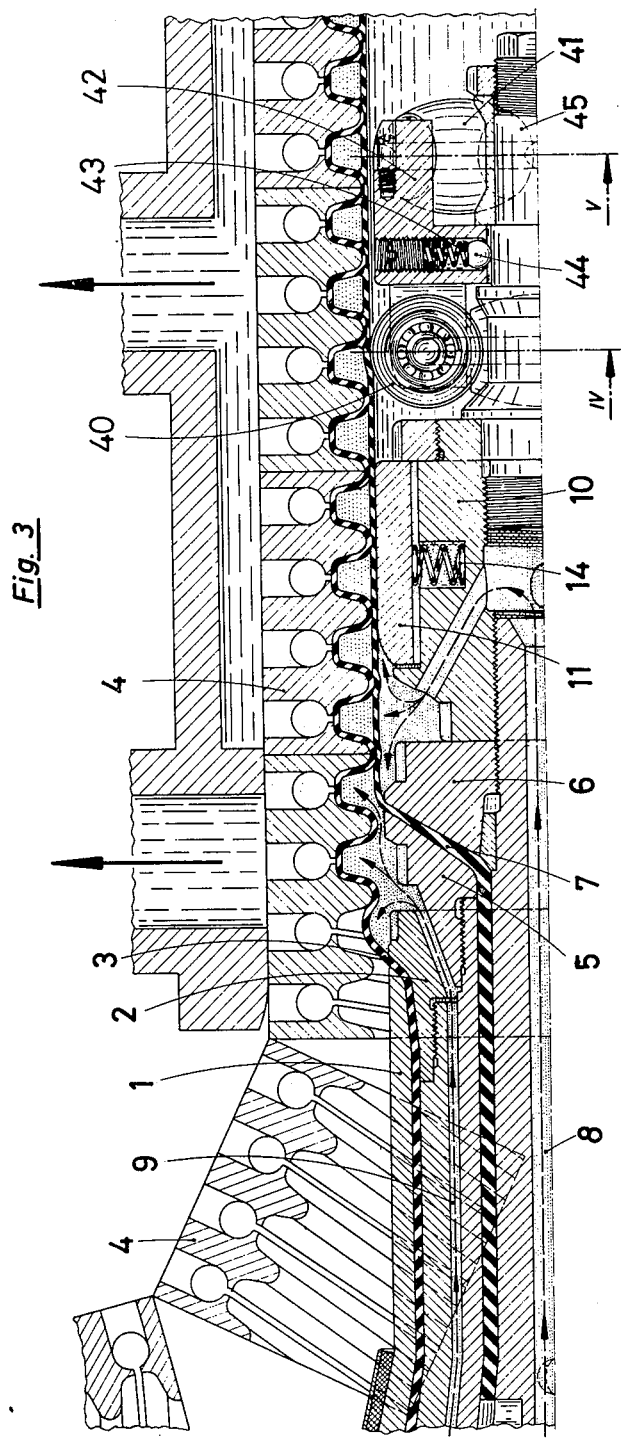
FIG. 3 is an embodiment comprising barrel-shaped rollers.
Figure 5:
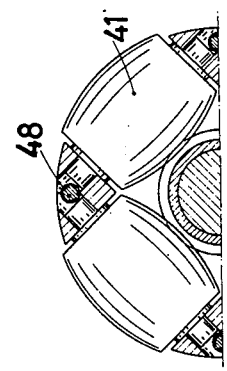
FIG. 5 is a sectional elevation taken along the line of V—V of FIG. 3.
Figure 4:
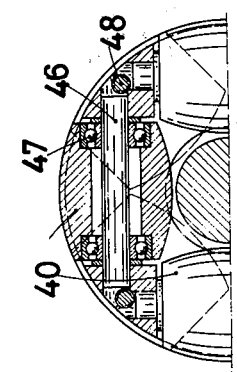
FIG. 4 is a section of FIG. 3 taken along the line of IV—IV of FIG. 3.

FIG. 3 is an arrangement which is suitable for the production of tubes having a thick inner wall. The disposition of the dies and of the channels for the introduction of supporting air corresponds to that in FIG. 1 and the same reference numbers are used to identify these details. The inner mandrel 6 is again provided with an extension 10 which carries a fully floating smoothing ring 11 and the weight of the ring is compensated by a compression spring 14.

Adjoining this arrangement which is here merely intended to provide preliminary smoothing, and which could be omitted, there is a further fully floating press-on device comprising barrel-shaped pressing rollers 40, 41. These rollers are rotatably mounted in a barrel roller bearing ring 42 which is supported on the mandrel extension 45 by a compression spring 43 and a ball 44. In the illustrated arrangement two sets of four rollers are mounted in planes normal to the extruder axis, and the two sets of rollers are relatively angularly displaced so that the rollers 41 of the second set press those parts of the inner tube into contact with the outer tube, which have not been pressed by the first set 40. Each roller is freely mounted in the roller bearing ring 42 on an axle pin 46 with the interposition of a ball bearing 47. The roller axles are prevented from shifting by retaining pins 48. The bias of the spring 43 is calculated precisely to balance the weight of the entire roller assembly when this is in axially concentric position.

The diameter of the roller assembly is conveniently such that at the points where the inner wall is fused to the outer wall the overall thickness of the plastic tube will be reduced to that of the wall of the outer tube, so that at these points the wall thickness will not build up to the combined thickness of inner and outer tubes but will be restricted to the thickness of the wall of the outer tube, surplus material of the inner wall being squeezed aside by the rollers. If the tubes are to be used as drain pipes, the cutting of the necessary openings is thus facilitated.

If the synthetic plastics material is one that tends to be sticky, then all the parts which come into contact with the inner tube, viz., the smoothing ring 11, the cylinder 31 and the rollers 40, 41 should be provided with a coating of polytetrafluoroethylene.

What is claimed is:

1. An improvement in an apparatus for forming an outer corrugated tube wherein the corrugations of said tube abut an inner tube within said corrugated tube, said apparatus comprising means for forming an outer corrugated tube about a die and within cooperating mold halves, means for forming an inner tube about a central mandrel operatively associated with said die and within said corrugated tube which improvement comprises means for urging said inner tube against the corrugations of said outer corrugated tube, said means comprising a presser floatingly mounted on an extension of said central mandrel to move freely in any direction in a plane normal to the axis of the extruding die and said presser having means urging said presser outward toward the inner wall of said inner tube.

2. An apparatus according to claim 1 wherein said floatingly mounted presser is generally cylindrical and has grooves on its surface.

3. An apparatus according to claim 2 wherein said device includes means for supplying air within said inner tube and through said grooves.

4. An apparatus according to claim 2 wherein said floatingly mounted presser has a multiplicity of helical grooves on the surface.

5. An apparatus according to claim 2 wherein said grooves are helical grooves and the pitch of the helical grooves is opposite to the pitch of the corrugations of said outer tube.

6. An apparatus according to claim 1 wherein said floatingly mounted presser comprises at least two sets of opposed rollers disposed sequentially over the path of travel of said inner tube and said outer tube which bear against the surface of said inner tube and urge the same toward said outer tube.

7. An apparatus according to claim 6 wherein there are a plurality of sets of opposed rollers.

8. An apparatus according to claim 6 wherein the opposed rollers of one set of rollers are angularly offset from the position of the rollers of another set.

9. An apparatus according to claim 6 wherein said rollers are barrel rollers.

10. An apparatus according to claim 6, wherein said sets of rollers are rotatably mounted in a barrel roller bearing ring, said ring floatingly mounted on said mandrel extension.

11. An apparatus according to claim 10 wherein between said bearing ring and said mandrel extension is inserted a spring which is so biased, that it is able to balance the weight of the entire roller assembly.

12. An apparatus according to claim 1 wherein said floatingly mounted presser device has a smooth surface.

13. An apparatus according to claim 1 in which on the extension of said central mandrel are floatingly mounted a generally cylindrical ring and at least two sets of barrel rollers disposed sequentially over the path of travel of said inner tube and said outer tube.

14. An apparatus according to claim 1 wherein between said floatingly mounted presser and said extension of the central mandrel there is inserted a spring which is so biased that it is just able to carry the weight of said presser.

15. An apparatus according to claim 1 wherein said mandrel supports said presser by a spring such that there is a clearance between said mandrel extension and said presser, said clearance being sealed by a threaded ring.

16. An apparatus according to claim 1 wherein said presser has a surface of polytetrafluoroethylene.

* * * * *